United States Patent [19]

Greig et al.

[11] 4,260,489

[45] Apr. 7, 1981

[54] TREATMENT OF OILY SLUDGE

[75] Inventors: George Greig, Lightwater; Michael P. Broadribb, Rochester, both of England

[73] Assignee: The British Petroleum Company Limited, London, England

[21] Appl. No.: 58,946

[22] Filed: Jul. 19, 1979

Related U.S. Application Data

[63] Continuation of Ser. No. 884,156, Mar. 7, 1978, abandoned.

[51] Int. Cl.³ .................. B01D 11/02; B01D 25/32
[52] U.S. Cl. .................... 210/771; 208/13; 210/772; 210/778
[58] Field of Search .................... 134/40; 208/13; 210/66–68, 70, 73 W, 75, 79, 81, 82, 21

[56] References Cited

U.S. PATENT DOCUMENTS

| | | | |
|---|---|---|---|
| 1,857,810 | 5/1932 | Gee | 210/82 |
| 2,101,012 | 11/1937 | Pond et al. | 210/81 |
| 2,430,182 | 11/1947 | McGuire et al. | 210/73 W |
| 3,433,816 | 3/1969 | Müller | 210/66 |
| 3,574,329 | 4/1971 | Beav | 210/80 |
| 3,835,021 | 9/1974 | Lorenz et al. | 210/67 |
| 3,859,213 | 1/1975 | Hunt | 210/75 |

FOREIGN PATENT DOCUMENTS

| | | | |
|---|---|---|---|
| 1340931 | 12/1973 | United Kingdom . | |
| 424580 | 2/1975 | U.S.S.R. | 210/81 |

OTHER PUBLICATIONS

*The Condensed Chemical Dictionary*, 8th Ed., 1971, p. 411.

*Primary Examiner*—Peter A. Hruskoci
*Attorney, Agent, or Firm*—Morgan, Finnegan, Pine, Foley & Lee

[57] ABSTRACT

Oily sludge is treated by filtering it through a precoated surface filter, treating the filtration residue with a hydrocarbon solvent and/or steam stripping the extracted residue.

The residual oil content of the treated sludge is very low and it can be used for land fill operations.

13 Claims, No Drawings

TREATMENT OF OILY SLUDGE

This is a continuation of application Ser. No. 884,156, filed Mar. 7, 1978, now abandoned.

This invention relates to a method for treating oil contaminated solids, particularly the residues formed as a by-product from the treatment of oil contaminated water, such as refinery or other industrial plant effluent, or resulting from the long standing of crude petroleum or petroleum products in tanks or other forms of storage.

As a first step in the treatment of oil contaminated waters it is common practice to effect a rough separation in a gravity separator to remove the bulk of the oil and suspended solids. Suitable separators include parallel plate separators, settlement tanks and API Separators as described in the "Manual on Disposal of Refinery Wastes", published by the American Petroleum Institute in 1969.

Oil recovered from such devices can be used as a source of energy and the aqueous effluent is suitable for further treatment to reduce its oil content and BOD to very low levels.

Such a further treatment is disclosed and claimed in our copending British Patent Application Ser. No. 1,449,342 (BP Case 3637) which claims a method for treating effluent water containing suspended oil which method comprises passing the effluent water firstly through a sand filter to remove the suspended oil and subsequently through a biological percolating filter.

Returning to the primary separation devices, there is a third product from them which builds up over a period of time and the disposal of which gives rise to problems. This is an oily sludge which can have a water content in the range 20–95% by weight and an oil content in the range 5–70% by weight, the remainder being solid materials such as silt, rust, carbon, calcium carbonate, etc.

Other sources of oily sludge are sand filter backwash water from the effluent treatment process described in British Pat. No. 1,449,342 and the top oily sludge layer from gas/air flotation plants for the removal of dispersed oil and suspended solids from water.

Oily sludge is a difficult material to process since it tends to block filters and adhere to them.

The only environmentally acceptable method of dealing with these sludges is by burning, but this requires the provision of special incinerators which are expensive to purchase, install, operate and maintain and which result in the wasteful destruction of oil.

A process has been disclosed in British Pat. No. 1,340,931 in which oily solid particles suspended in aqueous effluent are retained by a sand filter.

A sand filter operates by allowing the liquid to be filtered to percolate slowly downwards through a thick bed of filter sand. The sand is relatively coarse when compared with the solid particles to be retained and the particles, especially the finer ones, tend to pass through the upper reaches of the sand. Eventually, however, the packing results in tortuosities and restrictions which trap the particles, including the finer ones.

Because of their effectiveness in dealing with materials which tend to block or pass through other filters, sand filters are widely used in oil refineries and similar installations.

The same factors which result in the efficiency of the sand bed when working as a filter give rise to problems when regeneration is necessary, however. In order to regenerate a filter, retained solid particles must be removed. Because particles are trapped at all levels in the filter bed, regeneration, either by backward or forward flushing, means that some particles have again to traverse the bed and again are likely to meet with further restrictions which tend to retain them in the filter unless dislodged. In order to combat this, it is necessary to wash either frequently or for long periods and to use high flow rates and/or liquid under high pressure with the ever present risk, unless great care is exercised, of disturbing the structure of the filter bed and rendering it inefficient for subsequent filtration stages, unless restructured.

The residue resulting from the filtration of oily sludge adheres strongly to a sand filter and the difficulties of regeneration are such that sand filters have been rejected for such operations.

There exists a need, therefore, for a simple method of filtration which is capable of dealing with concentrated oily sludge, a more difficult feedstock than the dilute suspensions previously treated, and which uses a filter which is easily regenerable.

We have now discovered that a pre-coated surface filter is capable of meeting this need. It is indeed surprising that a surface filter can be used since the teachings of the art would suggest that an even thicker depth filter would be necessary and that restructuring the filter bed after regeneration could not be avoided.

Thus according to the present invention there is provided a method for the treatment of an oily sludge which method comprises the steps of filtering the sludge undiluted with recovered oil in a pre-coated surface filter, treating the filtration residue with a light hydrocarbon solvent and/or steam stripping the extracted residue.

Suitable pre-coat materials include diatomaceous earth, fly ash and powdered polymers, e.g., polyurethanes.

Before filtering sludges with a high solids content, water is preferably added as a diluent. Alternatively a light hydrocarbon solvent may be employed.

The filtration may be carried out at ambient or elevated temperature. If elevated temperature is used, the oily sludge may be directly heated by conventional means, e.g., steam coils.

Suitable surface filters include plate, leaf and tube or candle filters. The filters are preferably operated under pressure as opposed to vacuum.

In such filters, the pre-coat is effectively the filter medium and the function of the plate, leaf and tube or candle, etc., is to act as a support.

The preferred hydrocarbon washing solvent is kerosine, but other solvents such as naphtha are also suitable. Treatment may be at ambient temperature but higher temperatures may be advantageous in certain cases.

Solvent washing may be carried out in two stages, with the relatively clean solvent from the second stage of one cycle being used in the first stage of the next cycle to wash heavily contaminated solids.

Filter aids similar to or identical with the precoat medium may be added to the sludge before filtration to ensure longer and improved filtration by increasing the porosity of the filter cake, reducing the differential pressure per unit cake thickness and preventing the cake from blinding.

For a low concentration of up to 1% by weight solids in the feed sludge, the amount of filter aid used is preferably in the range 2–4 times the weight of solids. For a medium concentration of 1–4% solids, the amount of filter aid used is preferably in the range 1–2 times the weight of solids. For a high concentration, e.g., 4% or higher solids, the amount of filter aid used is preferably in the weight range 0.5–1.5 times the weight of solids. In general, the finer the particle size of the solids, the more filter aid is required.

It is advantageous to use the minimum quantity of filter aid consistent with satisfactory filtration, since the less filter aid employed, the slower the build up of filter cake and the longer the filtration run.

As an additional feature, it may be advantageous to interpose a drying stage after the filtration and before the solvent extraction. Drying may be achieved by treatment with hot or cold air.

The filtration flowrate is suitably in the range 1–200 gallons per square foot of filtration area per hour (0.05–10 m$^3$/m$^2$/hr), preferably in the range 10 to 50 gal/ft$^2$/hr (0.5–2.5 m$^3$/m$^2$/hr).

Solvent consumption and flowrate are dependent on the oil content of the filtered solids.

Steam consumption and pressure are dependent on the boiling point of the solvent.

The filtered solids are easily removed from the filter, e.g., by scrapang or centrifugal action, thus leaving the filter clean to resume the next cycle.

It is believed that the solid particles present in the sludge stabilise emulsification of the oil and water also present and that, with their removal, the oil and water can subsequently separate more easily. Some oil, however, is retained by the solids and is removed by the solvent extraction and/or steam stripping.

By the method of the present invention it is possible to convert an oily sludge to a dry solid containing less than 1% by weight oil. Such material is suitable for land fill operations.

The invention is illustrated by the following example.

EXAMPLE

Sludge used: Refinery API Separator Bottom Sludge
Analysis: Oil 40%; Water 52.5%; Solid 7.5%.
Filter: Stainless Steel Candle Filter.

The filter tube (100 micron aperture) was pre-coated with diatomaceous earth to a thickness of 3 mm. The sludge was slurried with 9 parts water to 1 part sludge and 0.4% w/w diatomaceous earth was added to the slurry as a filter aid. The slurry was then filtered at ambient temperature at an average flowrate of 24 gallons/hr/ft$^2$ of filtration area (1.25 m$^3$/m$^2$/hr). The filtration was terminated at a maximum differential pressure of 4 bar when 3.4 gallons/ft$^2$ of filtration area (150 miter/m$^2$) had been filtered. The filter body was drained and filled with kerosine at ambient temperature. The filtered solids were then washed in situ with 3 gallons kerosine/ft$^2$ of filtration area. The filtration body was drained and the filtered solids steam stripped in situ for 15 minutes. The steam pressure was 25 psig (1.7 bar (ga)).

Analysis of filter cake: Oil 0.8%; Water 0.6%; Solid 98.6%.

We claim:

1. A method for the treatment of oily sludge having a water content in the range of 20–95% by weight, an oil content in the range 5–70% by weight and the remainder solid particles, which method comprises the steps of diluting the oily sludge with water only, filtering the water-diluted oily sludge in a precoated surface filter to produce a filter cake comprising mainly said solid particles together with some oil and water, washing the filter cake while on the filter with a light hydrocarbon solvent selected from the group consisting of kerosene and naphtha to remove the oil and water, and steam stripping the washed filter cake to a residual oil content of less than 1% by weight oil.

2. A method according to claim 1 wherein the precoat material is diatomaceous earth.

3. A method according to claims 1 or 2 wherein the surface filter is a plate or candle filter.

4. A method according to claim 1 or 2 wherein the filter is operated under pressure.

5. A method according to claims 1 or 2 wherein the solvent is kerosene.

6. A method according to claims 1 or 2 wherein the solvent is heated.

7. A method according to claims 1 or 2 wherein the solvent washing is carried out in two stages with solvent from the second stage of one cycle being used in the first stage of the next cycle.

8. A method according to claims 1 or 2 wherein a filter aid is added to the oily sludge before filtration.

9. A method according to claim 8 wherein the filter aid is diatomaceous earth.

10. A method according to claims 1 or 2 wherein a drying stage is interposed after filtration and before solvent washing.

11. A method according to claims 1 or 2 wherein the filtration flowrate is in the range of 0.05–10 m$^3$/m$^2$/hr.

12. A method according to claim 11 wherein the filtration flowrate is in the range of 0.5–2.5 m$^3$/m$^2$/hr.

13. A method according to claims 1 or 2 wherein solid filter cake material is removed from the filter by scraping or centrifugal action.

* * * * *